Figure 1:
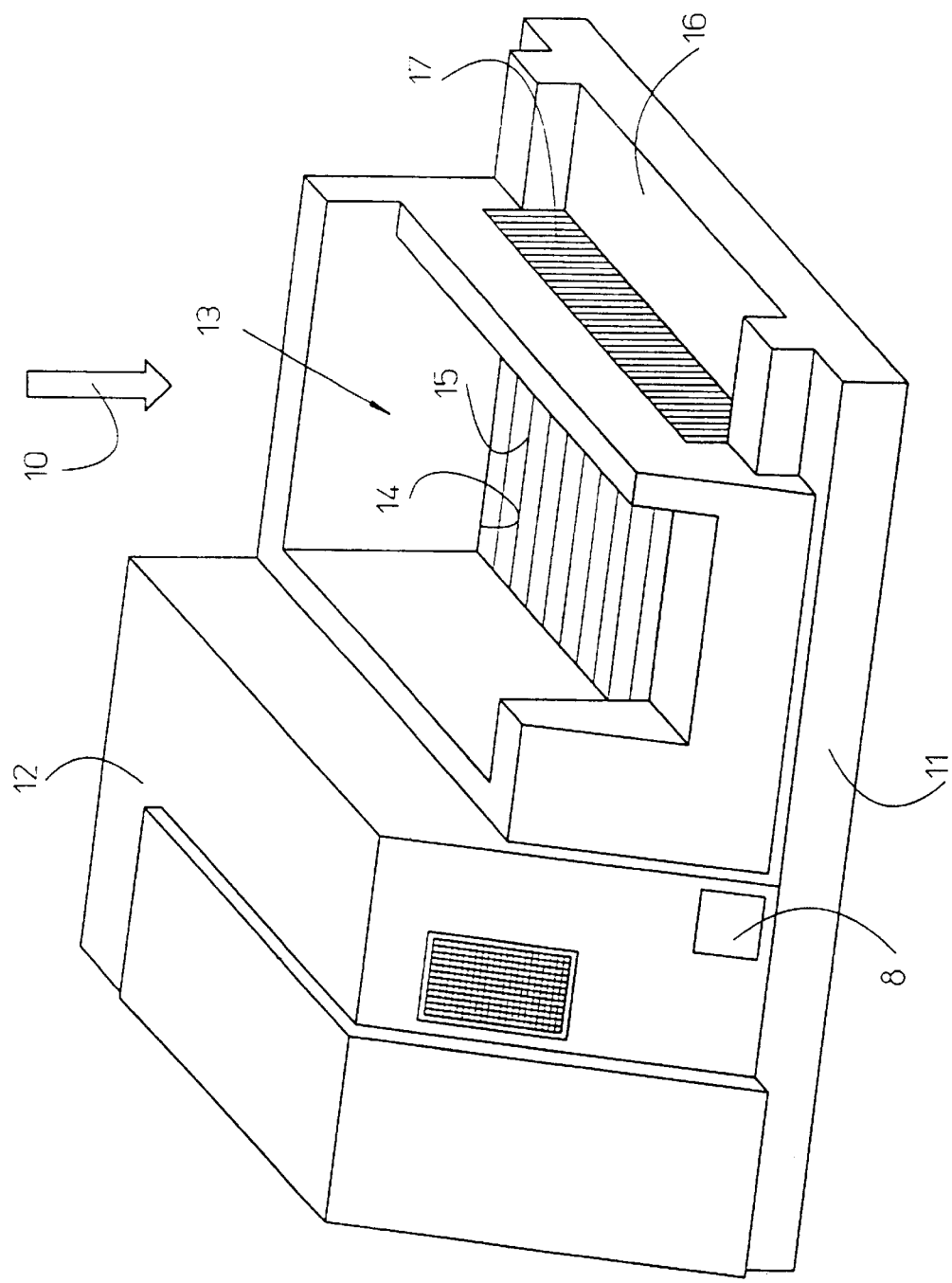

United States Patent [19]
Exelmans

[11] Patent Number: 5,818,065
[45] Date of Patent: Oct. 6, 1998

[54] RADIATION IMAGE READOUT METHOD AND APPARATUS

[75] Inventor: Walter Exelmans, Merksem, Belgium

[73] Assignee: Agfa-Gevaert, Mortsel, Belgium

[21] Appl. No.: 795,835

[22] Filed: Feb. 6, 1997

Related U.S. Application Data

[60] Provisional application No. 60/014,555 Apr. 3, 1996.

[30] Foreign Application Priority Data

Feb. 8, 1996 [EP] European Pat. Off. .............. 96200273

[51] Int. Cl.⁶ .............................. G03B 42/02; G01T 1/29
[52] U.S. Cl. ........................................... 250/588; 250/589
[58] Field of Search .................... 250/588, 584, 250/589

[56] References Cited

U.S. PATENT DOCUMENTS

| | | | |
|---|---|---|---|
| 4,786,808 | 11/1988 | Saito | 250/588 |
| 5,028,785 | 7/1991 | Kimura | 250/588 X |
| 5,530,261 | 6/1996 | Yasuda | 250/588 |

FOREIGN PATENT DOCUMENTS

| | | |
|---|---|---|
| 0288004 | 10/1988 | European Pat. Off. . |
| 0345832 | 12/1989 | European Pat. Off. . |
| 0599128 | 6/1994 | European Pat. Off. . |

*Primary Examiner*—Edward J. Glick
*Attorney, Agent, or Firm*—Baker & Botts, L.L.P.

[57] ABSTRACT

A radiation image read out method and apparatus wherein a photostimulable phosphor screen that has been exposed to radiation is read and erased and wherein a signal representative of the residual image still left in the screen after erasure is obtained and thresholded. In this way screens that have not been erased to an acceptable extent can be identified.

5 Claims, 2 Drawing Sheets

RADIATION IMAGE READOUT METHOD AND APPARATUS

This application claims the benefit of U.S. Provisional Application No. 60/014,555 filed Apr. 3, 1996.

1. FIELD OF THE INVENTION

The present invention is in the field of digital radiography. The invention more particularly relates to a method and an apparatus for determining the amount of residual energy left in a photostimulable phosphor screen after image read out.

2. BACKGROUND OF THE INVENTION

In the field of digital radiography a system has been developed wherein X-rays transmitted by an exposed object (such as the body of a patient) are stored in a photostimulable phosphor screen. Such a photostimulable phosphor screen comprises a layer of photostimulable luminescent material which comprises a phosphor, for example a europium-activated barium fluoro-halide, and a binder. The phosphor has the characteristic that it can be energised to an excited state by X-rays, and can then be stimulated by light within a first wavelength range to return to the ground state with the emission of light within a second wavelength range. The stimulating radiation is arranged to have a different wavelength from the emitted light. With regard to the specific example wherein a radiation image is stored in a screen comprising a europium-activated barium fluoro-halide phosphor, the stimulating light is situated within the range of 600–700 nm and the emitted light is situated within the range of 350–450 nm.

In order to read the image stored in the exposed screen, the screen is transported past a scanning station where it is two-dimensionally scanned with stimulating light. For this purpose stimulating light beam of a wavelength within said first or stimulating wavelength range is deflected so as to scan the screen in a first direction (called main scan direction) while the screen is transported in a second direction that is perpendicular to the main scan direction.

Light emitted upon stimulation is guided through a light guide member onto an opto-electric transducer such as a photomultiplier that converts the emitted light into a corresponding electric signal. Preferably a filter is positioned either at the entrance face of the light guide or between the output of the light guide and the opto-electrical transducer for preventing stimulating light from being detected by the opto-electrical transducer.

After read out the stimulable phosphor screen should be free from the previously stored radiation image so that it can be re-used.

In practice however, the stored radiation energy is not completely eliminated by the read out process. To make the screen re-usable, it is fed from the read out station to an erasing station where the part of the energy still remaining in the phosphor after read out is erased by subjecting the screen to a uniform illumination by means of erasing light.

But even if a photostimulable phosphor screen is erased after read out, it is still possible that residual energy is left on the read out screen. This may be caused by non-optimal adjustment or control of the amount of erasing energy that is applied to the photostimulable phosphor screen.

Non-optimal adjustment of the applied amount of erasing energy may be the result of the fact that the period of time during which a photostimulable phosphor screen is subjected to erasing light is too short (for example as a result of incorrect transport speed of the screen), or that the amount of energy emitted by the erasing light sources to the phosphor screen to be erased does not correspond with the set amount (for example due to a failing lamp) etc.

Only few of the possible causes have been mentioned, other causes are may be envisaged.

When a screen that has not been erased to an acceptable level is re-used and again exposed to a radiation image, the residual image left in the screen will be detected as if it were part of the new radiation image and hence the final read out image signal will be affected by noise.

In EP 345 832 a method and an apparatus for recording and reading out radiation images is disclosed. The apparatus comprises a circulatory feed system for feeding photostimulable phosphor sheets along a pre-determined circulatory feed path comprising in sequence an exposure unit, a read out unit and an erasure unit. Prior to successive recording of images on the sheets, any remaining images are erased. After erasure the sheet is again read out and the signal level is thresholded. If the signal level is higher than a certain level, then the remaining image is erased again in the image erase unit. The erasure step is repeated until the remaining image is sufficiently small.

3. OBJECTS OF THE INVENTION

It is an object of the invention to provide a radiation image read out method and apparatus wherein the signal-to-noise ratio of the read out image signal is optimized.

It is a further object of the present invention to provide such a method and apparatus wherein the amount of residual energy left in a photostimulable phosphor screen after image read out is controlled.

Further objects of the present invention will become apparent from the description hereafter.

4. STATEMENT OF THE INVENTION

To achieve the above objects the invention provides a method of reading a radiation image stored in a photostimulable phosphor screen comprising the steps of 1) scanning said screen with stimulating radiation,
2) detecting light emitted upon stimulation,
3) converting detected light into an electric signal representation of said image,
4) subjecting said screen to erasing light so as to obtain an erased screen,
5) applying steps 1 to 3 to at least part of said erased screen,
6) thresholding an electric signal obtained as a result of step (5) by means of a threshold signal value representative of a maximum amount of emitted light that is allowed to be detected on an erased screen, wherein said erased screen is scanned in step (5) at a resolution that is lower than the resolution at which the screen is scanned in step (1).

Preferably according to this invention the resolution at which the erased screen or at least part thereof is scanned is lower than the resolution at which the scanning of the screen is performed during read out prior to erasure.

In this way the period of time occupied by the additional reading of the erased screen is kept to a minimum.

In a particular embodiment a screen is scanned by deflecting a light beam in a first direction and transporting the screen in a second direction that is perpendicular to said first direction. The resolution at which the screen is scanned in step (5) is decreased relative to the resolution at which the screen is scanned at step (1) by adjusting the speed at which the erased screen is transported in said second direction during step (5) to be higher than the speed at which the screen is transported in said second direction in step (1).

In particular when the additional scanning of the erased screen and the scanning of the screen before erasure is performed by means of the same read out unit, it is impossible to perform the scanning of a new screen while another erased screen is still being scanned. So, the additional reading of the erased screen decreases the throughput of the read out apparatus.

This loss of throughput of the apparatus can be limited to an acceptable extent if the second scanning of the erased screen is performed at a lower resolution than the scanning of the screen before erasure (implemented e.g. by increasing the speed at which the screen is transported in the sub-scan direction).

The energy remaining in the screen after erasure should be sufficiently small. Preferably the signal level detected when the screen is read a second time at highest machine sensitivity is a 1000 times smaller than the maximum dynamic range of the read out apparatus at said highest sensitivity.

In case the signal resulting from step (5) exceeds a preset threshold signal value, this indicates that the screen has not been erased to an adequate extent allowing re-use of the screen. In this case the screen is either to be erased once more or it is to be decided that the particular screen cannot be re-used.

Another aspect of the present invention relates to an apparatus for reading a radiation image that has been stored in a photostimulable phosphor screen comprising (i) a read out unit with means for scanning a screen by means of stimulating radiation and means for detecting light emitted by said screen upon stimulation and converting detected light into a first electric signal representative of said radiation image, (ii) an erasing unit for subjecting a screen to erasing light so as to obtain an erased screen, (iii) means for transporting a screen from said read out unit to said erasing unit, wherein said apparatus further comprises (iv) means for transporting an erased screen from said erasing unit through a read out unit, (v) means for thresholding a second electric signal obtained by scanning at least part of an erased screen with stimulating radiation when it is transported through a read out unit, by detecting light emitted thereby and by converting said light emitted thereby into an electric signal, by means of a threshold signal representative of a maximum amount of emitted light that is allowed to be detected when an erased screen is scanned, wherein means are provided for decreasing the resolution at which an erased screen is scanned relative to the resolution at which a screen having stored therein a radiation image, is scanned.

In a preferred embodiment the apparatus of the above-described kind has a single read-out unit. Such an apparatus is particularly advantageous from the viewpoint of economy and compact design.

In a read out apparatus according to this preferred embodiment a read out unit is preferably located in between the input of the apparatus and the erasing unit.

The preferred embodiment of the apparatus further comprises means for transporting the screen from the input unit through the read out unit to the erasure unit and means for reversing the transport direction so that a screen is transported from the erasure unit through the read out unit to the input unit.

Preferably the means for transporting the screen transport it substantially in a single plane.

The operation of this apparatus is as follows. First the screen is taken out of the cassette at the input unit and fed into the read out unit where it is scanned by means of stimulating radiation. Light emitted upon stimulation is detected and converted into an image signal.

Upon termination of the read out operation, it is transported to the erasing unit where it is subjected to an illumination with erasing light.

Finally, the transport direction is reversed and the read out and erased screen is again transported through the read out unit to the input unit where it is put back into the cassette. In the read out unit the erased screen is scanned by means of stimulating radiation and, again, the light emitted upon stimulation is detected and converted into an electric signal. This signal now represents the residual image left in the screen after erasure.

This signal is then applied to an electronic comparator where its value is compared with a threshold signal representative of a maximum energy level that is allowed to be detected on the screen after erasure.

In a particular embodiment the photostimulable phosphor screen is conveyed in a cassette of the type comprising a flat substantially rigid base plate and a cap for the base plate which is releasably securable to the base plate so as light-tightly to cover a layer of photostimulable phosphor material applied to a face of the base plate.

In this embodiment the cassette is opened by lifting the cap. The cap is held in a position outside the read out apparatus. The base plate conveying the photostimulable phosphor screen is transported through the read out and erasing units in the same way as described higher for a screen that is entirely taken out of the cassette.

Because the transport of the cassette is organized in a way so that the read out cassette is passed through the read out unit a second time, it is not necessary in this type of apparatus to provide additional means, such as additional cassette transport means or additional read out means, to allow read out of the erased screen. The design of the apparatus can be made very compact.

Read out of the erased screen is preferably performed at a lower resolution than the resolution at which the screen is read out the first time (prior to the erasure of the screen).

Lowering the resolution provides that the period of time required to perform the additional read out step is kept to a minimum so that the throughput of the apparatus is not significantly reduced.

The lower resolution can be obtained by adjusting the speed of the scanning movement. Preferably the number of lines in the sub-scan direction (direction into which the screen is transported) scanned during read out of the erased screen is reduced relative to the number of lines scanned during read out of the screen prior to erasure.

For example when a screen is scanned during the main read out step at a resolution of 2500 lines in the slow scan direction, the slow scan speed is reduced to 100 lines during the read out step of the erased screen.

5. BRIEF DESCRIPTION OF THE DRAWINGS

Figure 2:
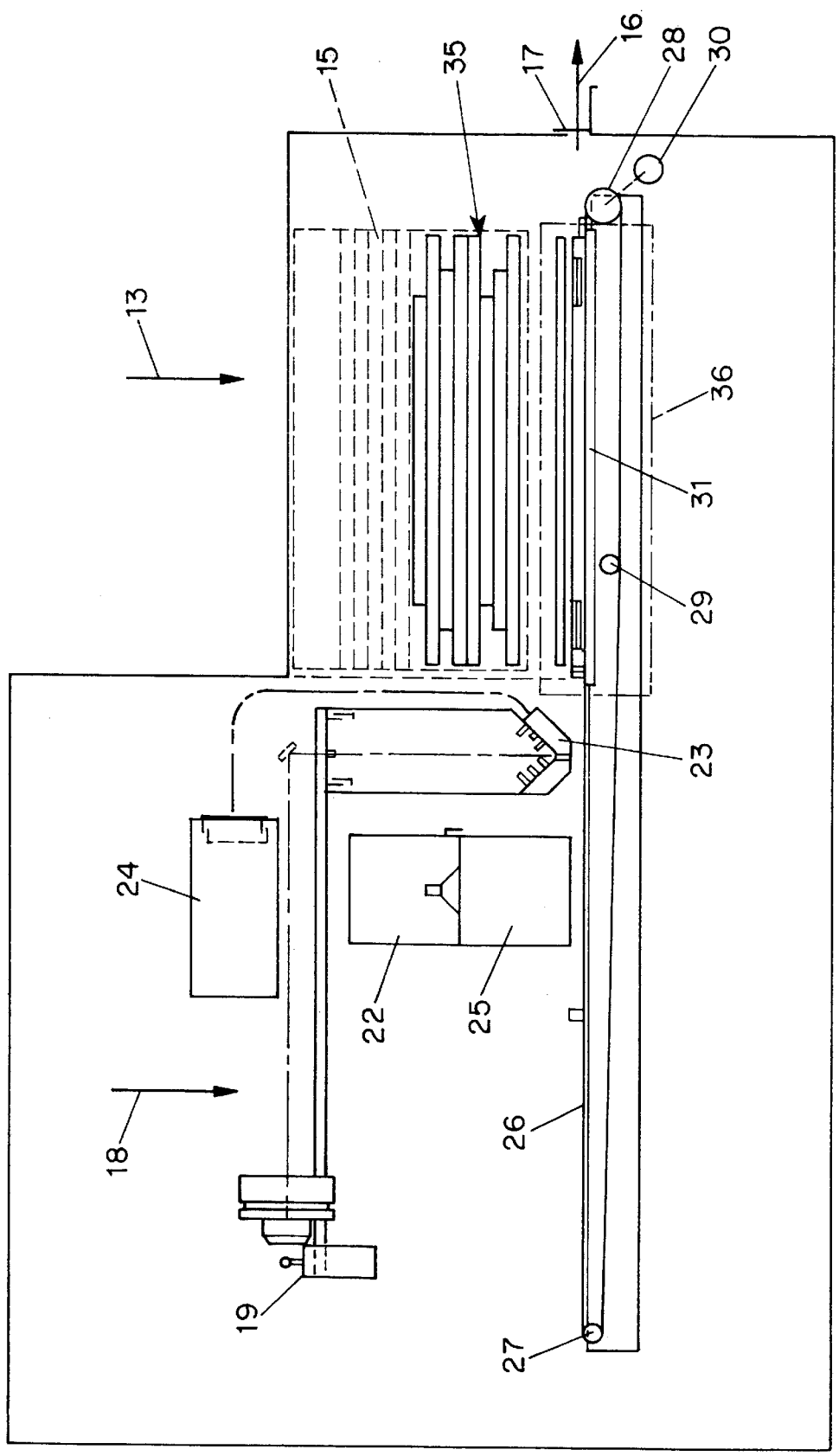

The invention is described hereinafter by way of example with reference to the accompanying drawings wherein:

FIG. 1 is a perspective view of one embodiment of a scanning apparatus according to the present invention, FIG. 2 is a diagrammatic longitudinal view of the scanning apparatus according to FIG. 1.

6. DETAILED DESCRIPTION OF THE INVENTION

One embodiment of a scanning apparatus in accordance with the present invention is shown in FIG. 1. The apparatus 10 generally comprises a housing 12 mounted on a base 11, and has a cassette input station 13 for receipt of a stack of image-wise exposed cassettes and for loading and unloading cassettes. This station has in its bottom a rectangular opening 14 forming the cassette entry port of the apparatus. A lighttight roller shutter 15 closes this port. The base of the apparatus has on its right-hand side a platform 16 for receipt of a processed cassette and also for introducing a cassette in the apparatus which should occasionally by-pass the cassettes stacked in station 13. The inlet port of this platform is closed by a lighttight curtain 17 or the like. Control panel 8 comprises the usual control provisions for operation of the apparatus.

FIG. 2 is a diagrammatic longitudinal unital view of the apparatus according to FIG. 1 showing the following elements:

- a read out unit 18 comprising a galvanometer mirror 19 for deflecting the radiation beam of a stimulating rays applying means (not shown), e.g. e helium-neon laser source, a focusing device (not shown), a plane reflection mirror (not shown), a light guide 23 which receives light emitted by a phosphor layer being scanned and a photomultiplier 24 receiving light at the output end of the light guide and producing an electrical signal proportional to the light intensity falling thereon;
- an erasing unit 25 comprising an erasing light source 22 such as a fluorescent lamp, a tungsten lamp or the like for erasing any residual image in the phosphor layer to enable subsequent re-use thereof by exposure to erasing radiation;
- an endless belt 26 guided over pulleys 27, 28 and 29, pulley 27 being reciprocatingly driveable by a motor 30, belt 26 suitably being a flat rubber belt or the like;
- a scanning carriage 31 arranged for being coupled to the endless belt, and for moving a cassette past the scanning and erasing unit;
- a roller shutter 15 shown in dashed lines, rolled on a roll for closing the entry port of the apparatus and supporting a stack 35 of cassettes to be scanned, and
- a cassette transfer station shown by rectangle 36 in dashed lines and comprising a mechanism for taking the cassettes away from the stack one by one.

The operation of the device is as follows. A cassette conveying a screen that has been exposed to an X-ray image is placed in the cassette input unit 13.

The cover of the cassette conveying the photostimulable phosphor screen is completely removable from the base thereby to expose a photostimulable phosphor layer applied on top of its base. The base comprises a rigid bottom plate onto which a photostimulable phosphor layer is provided. The photostimulable phosphor material may be directly coated on the base but suitably is coated on a flexible support such as a polyethylene terephthalate sheet which then is adhered to the base. The base has four rectangular recesses into which one part of interlocking patches, e.g. patches sold under the trade mark Dual Lock, manufactured by 3M, are fitted. The cooperating interlocking patches are fitted on corresponding places of the cover. Opening of the cassette may occur by means of pairs of fingers in the form of flat leaves or the like engaging grooves of the recesses accessible on the outside of the cassette. More details about suitable cassettes and their locking mechanism can be found in our co-pending application EP 0 567 175 A1.

The cassette is opened by lifting the cover and the base conveying a photostimulable phosphor screen is fed into the read out unit 18. In this read out unit the screen is line wise scanned by means of laser light emitted by a HeNe laser and deflected by a galvanometer mirror 19 to scan the screen in a first or main scan direction while the screen is transported by carriage and belt assembly 31, 26 in a second or subscan direction. The screen is transported in the sub-scan direction at approximately 12 mm/sec so that 2500 lines are scanned.

Light emitted by the screen upon stimulation is guided by light guide 23 onto a photomultiplier 24 and subsequently converted into a digital signal representation of the radiation image.

Then, the read out screen is conveyed to the erasing unit 25 where it is subjected to an illumination by means of light emitted by a quartz tungsten lamp.

After read out and erasure, the rotation of belt is reversed so that the carriage is moved rearwardly until reaching the position where the lifted cover is kept. The rotation of the belt is briefly stopped, the cover put back onto the base, and next the rotation of the belt is resumed.

During the rearward movement of the carriage 31 supporting the screen, the bottom of the cassette conveying the photostimulable phosphor screen is again transported past the read out means in the read out unit 18.

The speed at which the screen is transported through this unit (subscan speed) is increased relative to the speed at which the screen was transported through this unit during the first read out step. In this example it was increased to be equal to 300 mm/sec; so that the number of lines in the scan direction is equal to 100.

During its transport through the read out unit 18, the screen was again stimulated and the light emitted upon stimulation was likewise directed towards the photomultiplier and converted into a digital signal representation.

The sensitivity of the photomultiplier can be changed stepwise, each of the steps differing by a factor of two.

Each setting is called a 'sensitivity class setting' in analogy with the notion of 'speed classes' used in connection with conventional radiographic film.

In this particular application, the photomultiplier voltage was adjusted so that its sensitivity corresponds with the maximum setable sensitivity of the described device, i.e. a class 1200 setting.

The digital signal representation obtained by scanning the erased screen was then applied to an electronic signal comparator (not shown) where it was compared with a threshold signal so as to generate a signal indicating whether the signal read out from the erased screen was greater than the threshold signal thereby indicating that the screen had not been erased to a sufficient erasure depth.

The value of the threshold signal was set to correspond with $\frac{1}{1000}$ of the dynamic range of the read out apparatus at the set sensitivity class adjustment.

If the generated signal indicated that the threshold signal was exceeded, the transport direction of the belt was once more reversed and the screen was once again transported through the erasing unit 25 and was once more subjected to erasing light.

I claim:

1. An apparatus for reading a radiation image that has been stored in a photostimulable phosphor screen comprising:

i) a read out unit comprising means for scanning a screen in a first direction by means of stimulating radiation, means for detecting light emitted by said screen upon stimulation, and means for converting said detected light into a first electric signal representative of said radiation image;

ii) an erasing unit for subjecting said screen to erasing light so as to obtain an erased screen;

iii) means for transporting said screen at a first speed in a second direction perpendicular to said first direction from said read out unit through said erasing unit;

iv) said transporting means transporting said erased screen along said second direction at a second speed higher than said first speed from said erasing unit through said read out unit;

v) means for comparing a second electric signal to a threshold signal representative of a maximum amount of emitted light allowed to be detected from said erased screen to determine whether said erased screen should be further subjected to said erasing light, said second electric signal being obtained by scanning at least part of said erased screen with said stimilating radiation when it is transported through said read out unit at said second speed, detecting light emitted by said erased screen, and converting said light emitted by said erased screen into said second electric signal, wherein means are provided for decreasing the resolution at which said erased screen is scanned relative to the resolution at which said screen having said stored radiation image is scanned.

2. The apparatus according to claim 1,further comprising an input unit for feeding said screen into said read out unit and means for reversing the direction of movement of said means for transporting said screen when said screen has been transported through said erasing unit.

3. The apparatus according to claim 1, wherein said screen and said erased screen are transported substantially along a single plane.

4. A method of reading a radiation image stored in a photostimulable phosphor screen comprising the steps of:

scanning said screen at a first resolution with a stimulating radiation, said scanning step comprising the steps of:

deflecting said stimulating radiation in a first direction, and transporting said screen at a first speed in a second direction perpendicular to said first direction;

detecting light emitted by said screen upon scanning with said stimulating radiation;

converting light detected from said screen into a first signal representative of said image;

subjecting said screen to erasing light to obtain an erased screen;

scanning at least part of said erased screen, at a second resolution lower than said first resolution, with said stimulating radiation, said step of scanning said erased screen comprising the steps of:

deflecting said stimulating radiation in said first direction, and transporting said erased screen along said second direction at a second speed higher than said first speed;

detecting light emitted by said erased screen upon scanning with said stimulating radiation;

converting light detected from said erased screen into a second signal representative of said image;

comparing said second signal to a threshold signal representative of a maximum amount of emitted light allowed to be detected from said erased screen to determine whether said erased screen should be further subjected to said erasing light.

5. The method according to claim 4, further comprising the step of subjecting said erased screen to said erasing light such that said second signal does not exceed said threshold signal.

* * * * *